United States Patent
Rizkin et al.

[11] Patent Number: 6,152,577
[45] Date of Patent: Nov. 28, 2000

[54] REMOTE ILLUMINATION SYSTEM HAVING A LIGHT OUTPUT MODIFYING APPARATUS

[75] Inventors: Alexander Rizkin, Redondo Beach; Yevgeniy Y. Durets, Long Beach; Carl E. Oberg, North Hills; David Ruiz, Redondo Beach; Robert H. Tudhope, Rancho Palos Verdes, all of Calif.

[73] Assignee: Physical Optics Corporation, Torrance, Calif.

[21] Appl. No.: 09/166,052

[22] Filed: Oct. 5, 1998

[51] Int. Cl.[7] .................................................. F21V 21/28
[52] U.S. Cl. ......................... 362/281; 362/552; 362/583; 362/293; 359/889
[58] Field of Search .................................. 362/551, 552, 362/583, 293, 281, 282, 284, 322, 323, 324; 359/889, 893

[56] References Cited

U.S. PATENT DOCUMENTS

| | | | |
|---|---|---|---|
| 4,043,646 | 8/1977 | Heine et al. | 350/315 |
| 5,534,704 | 7/1996 | Robinson et al. | 250/550 |
| 5,779,353 | 7/1998 | Kacheria | 362/293 |
| 5,825,440 | 10/1998 | Kim | 362/26 |
| 5,877,681 | 3/1999 | Williams et al. | 340/471 |
| 5,917,405 | 6/1999 | Joao | 340/426 |

*Primary Examiner*—Darren Schuberg
*Assistant Examiner*—Fayez Assaf
*Attorney, Agent, or Firm*—Nilles & Nilles, S.C.

[57] ABSTRACT

An illuminator for a high energy remote lighting system includes a light source for generating light energy and a selectively positionable light output modifying apparatus having a plurality of light output modifying elements, each element corresponding to a predetermined position of at least a portion of the apparatus. At least some of the light output modifying elements of the apparatus are configured to filter light energy to provide either dimmed or colored light. The illuminator can be implemented in a system having a plurality of area control panels, each control panel generating a control signal indicative of a corresponding light characteristic, the illuminators each being coupled to a corresponding one of the area control panels to receive the control signal and to output a particular type of light in response thereto.

18 Claims, 6 Drawing Sheets

REMOTE ILLUMINATION SYSTEM HAVING A LIGHT OUTPUT MODIFYING APPARATUS

BACKGROUND OF THE INVENTION

1. Field of the Invention

The present invention relates to the field of lighting and, in particular, to lighting systems that have a remotely located light source. Particularly, the present invention relates to high power lighting systems having remote illuminators that are capable of selectively providing dimmed and/or colored light.

2. Description of the Related Art

High energy lighting systems are often used in applications in which efficient distribution of light to a plurality of points dispersed over a relatively large area is necessary. For example, such systems are required for airport approach lighting systems (ALS) and for ship navigation lighting systems. Often, a particular application will require that light having different levels of brightness be transmitted to designated lighting points in a lighted region. Alternatively, particular regions may require different colored light. For example, to meet ICAO and FAA regulations, an approach lighting system must operate at five brightness levels depending on factors such as time of day, visibility, and other related conditions. Similar requirements exist for at least some ship navigation purposes. For example, Navy ships have particular light characteristic requirements depending on elements such as fog, etc.

Dimming of visual approach aids and navigation lighting systems, as achieved by current systems, typically is based on current or voltage monitoring, which is an indirect measurement of light attenuation. These systems are bulky and utilize high-powered electrical regulators that are expensive, sensitive to load, and subject to false indications of particular conditions associated with the circuitry caused by, for example, variations in loop current or voltage and lamp impedance, aging effects, and other factors.

More particularly, and with respect to an application of the present invention, precise requirements are set for coloring and/or dimming lights on ships depending upon certain predetermined conditions. For example, the United States Navy designates white, amber, and red light for illuminating particular areas of the ship depending upon particular conditions. In addition, similar to ALS systems regulated by the FAA, the Navy has certain light intensity requirements for its air-capable ships. Current known systems for coloring and dimming lights on ships typically consist of providing two separate systems for coloring and dimming the lights. To dim the lights, most systems utilize a rheostat for controlling voltage (and in some cases color) which renders the system bulky and not optimally cost-effective. To color the lights, known systems often utilize colored filters in conjunction with a single lamp or, in some instances, multiple lamps each corresponding to a particular color. Typically, the user must manually position an appropriate filter adjacent to the lamp such that the lamp emits light having a corresponding color. The user manually places a piece of colored plexiglass adjacent to all of the lamps (potentially hundreds) for each light on the ship that requires a particular color. This is a tedious and inefficient task requiring an unreasonable amount of man-hours to maintain.

Some known high-energy lighting systems that provide dimmed light allow the user to select a particular brightness by setting the regulated constant current supplied to the light sources. Control and monitoring of the current is typically provided by an electronic subsystem. Notably, there are a variety of attendant problems with systems that measure and regulate only electrical parameters while maintaining a constant output current. For example, variations in the brightness of the lamps across the lighted area can be caused by dispersion parameters of individual incandescent lamps, aging, different resistances in current loops, etc.; further, such variations often occur even with perfect monitoring of the output current. Overall, known systems provide imperfect control and monitoring of the supplied light whether or not the light is dimmed or colored.

Further, one of the major problems encountered with a system having a plurality of light sources is light source failure. Replacing the lamps in such a system is a significant maintenance expense.

One solution to at least some of these problems is proposed in U.S. Pat. No. 5,629,996, which discloses a high definition universal remote lighting system (RLS) for an approach lighting system (ALS) that combines 1) a single light source coupled to a light pipe (or a bundle of light pipes) such as a fiber optic cable, and 2) a beamformer coupled to each light pipe for shaping the light according to particular requirements. This system separates the light source from the lighting points to provide high energy lighting to a remote location, and can illuminate several lighting points with a single light source. The system includes a direct optical monitoring loop through the use of a liquid crystal optical switch device (OSD) in conjunction with currently-used multilevel current regulators to provide fine light control and an absolute indication of the state of each ALS light source. The beamformers operate to finely shape the light and can dim/color the light as necessary. Although they are effective at meeting precise lighting requirements, beamformers are comprised of a relatively complex arrangement of components (light transformers, holographic diffusers, etc.) that add to system cost. Therefore, a conspicuously absent feature of known remote illumination systems is a way to dim and/or color the light output by the light source, prior to coupling the light to the distribution light pipes, with an apparatus that is relatively inexpensive to manufacture and yet provides a highly reliable output. Another feature absent from known systems is a ready way to control the light supplied to the individual lighting points corresponding to particular areas.

The field of high energy lighting systems is in need of an illuminator for dimming/coloring the source light, preferably at the light source, in a cost-effective fashion. Also, a system that combines the benefits associated with remote source lighting, including using a single light source to provide light at a variety of points at a remote location, with such an illuminator, is desired. In addition, the lighting system should be controllable from a plurality of remote locations for convenient modification of the characteristics of the light supplied to particular regions of a lighted area.

OBJECTS AND SUMMARY OF THE INVENTION

The present invention is directed to a remote high energy lighting system having an illuminator that is configured to dim/color the source light at a remote location of the light source in a cost-effective fashion. Each illuminator preferably utilizes a single light source to provide light to a variety of points disposed at a remote location, the light having characteristics indicative of a user's particular requirements. The illuminator of the present invention can be used as a lighting system that is controllable from a plurality of remote locations for convenient modification of the characteristics of the light supplied to particular regions of a lighted area.

According to one aspect of the invention, an illuminator for a high energy remote lighting system includes a light source that generates light energy, the light source being mounted in a housing having an output port to which is connected an optical connector. A light conveying device is coupled to the optical connector such that light energy input thereto can be transmitted to a remote location. The illuminator also includes a light output modifying apparatus that has a plurality of light output modifying elements, and that is movable to selectively position a selected one of the elements at a location intermediate the light source and the optical connector to receive light energy generated by the light source, and control the output light energy.

According to another aspect of the invention, the light output modifying apparatus further includes a controller configured to provide a control signal indicative of a particular type of light energy desired to be output by the illuminator. The apparatus also includes 1) a movable device having a plurality of openings each configured to retain at least one of the light output modifying elements, and 2) a motor coupled to the movable device to position the device in response to the control signal.

According to a still further aspect of the invention, the movable device is a rotatable disk, and the motor includes a rotatable drive shaft mechanically coupled to the disk to rotate the disk in response to the control signal, thus positioning the disk such that a selected light output modifying element conditions the light as desired prior to coupling of the light to the outlet of the illuminator.

According to another aspect of the invention, at least one of the light output modifying elements is a light intensity controlling filter that has a two-dimensional quasi-periodical structure.

In an another aspect of the invention, a method of remotely transmitting light having a particular characteristic to a plurality of lighting points includes the steps of providing an illuminator having a light source, a controller, a selectively positionable light output modifying apparatus having a plurality of light output modifying elements, and a motor responsive to a control signal generated by the controller. Further steps of the method include transmitting the output control signal to the motor and directing light from the light source towards the selectively positionable light output modifying apparatus. Then, the light output modifying apparatus is positioned, by the motor, such that the light energy is incident upon a corresponding one of the elements positioned downstream of the light source, hence modifying the light output by the illuminator as desired by the user.

According to another aspect of the invention, a remote lighting system (RLS) for providing light having a particular characteristic to a plurality of lighting points includes a plurality of area control panels, each generating a control signal indicative of a corresponding light characteristic. The system further includes a plurality of illuminators, configured according to the preferred embodiments herein, each illuminator 1) being coupled to a corresponding one of the area control panels via a telecommunication link, and 2) being configured to receive the control signal and to output light, preferably, to a plurality of optical cables.

DETAILED DESCRIPTION OF THE PREFERRED EMBODIMENTS

The present invention and the various features and advantages thereof are explained more fully with reference to the nonlimiting embodiments described in detail in the following description.

Figure 1:
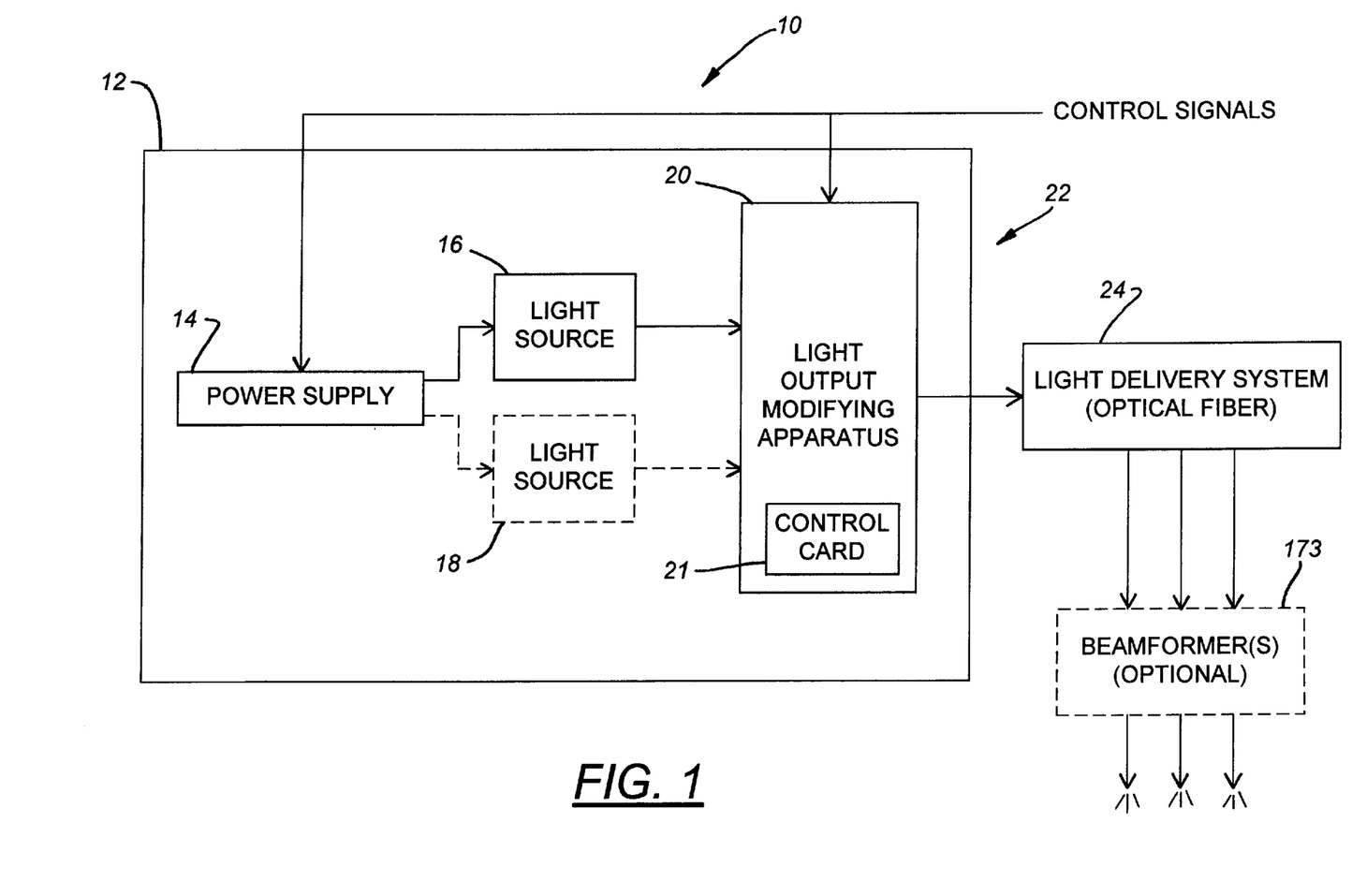
FIG. 1 is a schematic view of a high energy remote source lighting system according to the present invention, the system being capable of providing dimmed and/or colored light.

Referring initially to FIG. 1, a remote source lighting system 10 that provides high energy lighting includes an illuminator 12 having as its primary components a power supply 14 and one, and possibly two light sources 16, 18. The power supply 14 is controlled by control signals, transmitted by a system controller (not shown in FIG. 1) to selectively supply power to the first light source 16, and optionally to the second light source 18 (if present). Light source 16 is a high energy source such as a metal-halide lamp. In operation, light source 16 (and/or light source 18) directs light energy toward an output end 22 of illuminator 12. Light output from illuminator 12 is then coupled to a light delivery system 24. Light delivery system 24 preferably comprises a plurality of fiber optic cables 144 having a distal end 172 (see, e.g., FIGS. 3 and 8) for providing light energy to a plurality of lighting points strategically dispersed over a designated area, e.g., over particular regions of a navel ship. Optionally, light delivery system 24 is connected to a plurality of beamformers 173 connected to the fiber optic cables 144 at their distal ends 172 for shaping the output light depending upon user requirements.

Illuminator 12 also includes a selectively positionable light output modifying apparatus 20 that is optically coupled to light source 16 such that apparatus 20 is disposed downstream of the light source 16 in the direction of light energy propagation. Light output modifying apparatus 20 is configured to dim, color or otherwise modify the light energy emitted by light source 16. Operation of apparatus 20 preferably is controlled by a controller (e.g., a control card 21) that generates an output control signal in response to input control signals generated by a system controller (not shown) such that illuminator 12 outputs light having particular, user-selected characteristics.

Figure 2:
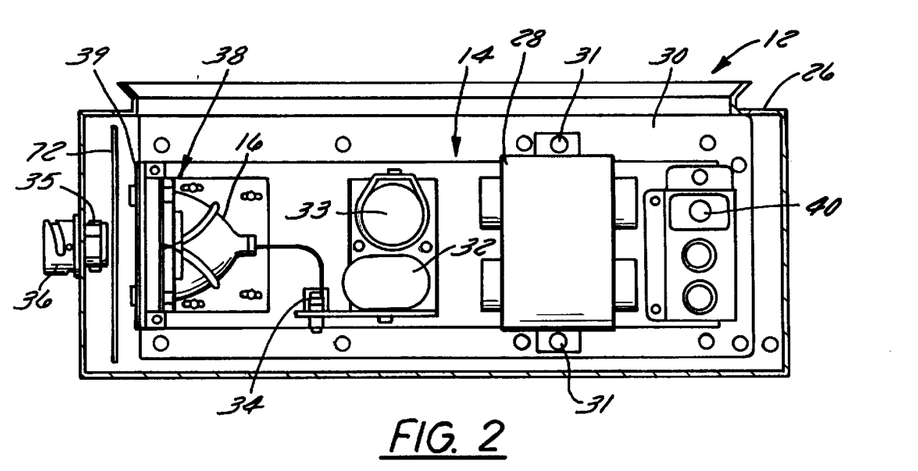
FIG. 2 is a side elevational view of an illuminator according to the present invention.
Figure 3:
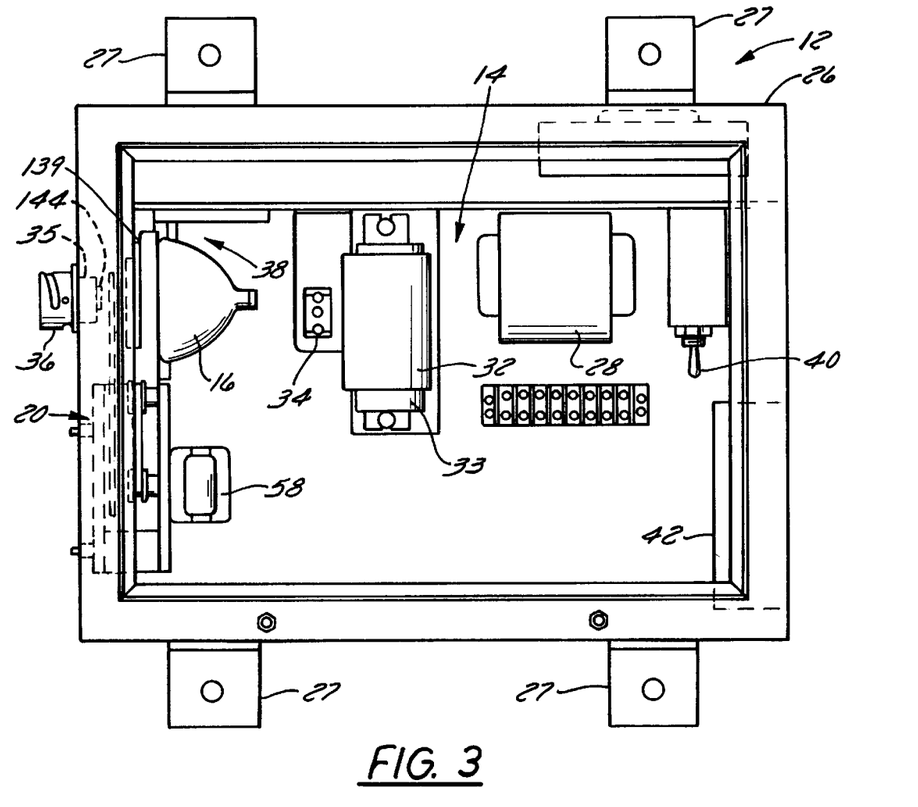
FIG. 3 is a top plan view of the illuminator shown in FIG. 2.

Turning to FIGS. 2 & 3, illuminator 12 includes a housing 26 within which the components of the illuminator are mounted. Housing 26 preferably has a plurality of mounting flanges 27 having apertures for receiving fasteners for appropriately mounting and stabilizing illuminator 12 on a support. Power supply 14 is mounted in the housing 26 and includes a transformer 28 that is mounted to a sidewall 30 of housing 26 with fasteners 31, e.g., rivets. Transformer 28 is coupled to a central source of power (not shown) for supplying power to illuminator 12. Power supply 14 also includes a capacitor 32 and an ignitor 33 that collectively receive power from transformer 28 and operate to actuate light source 16. A terminal 34 is provided for electrically coupling power supply 14 to light source 16. Alternatively, power supply 14 could be a electronic ballast or any other suitable power source. Light source 16 is secured to housing 26 via a light mounting structure 38. A safety power switch 40 is also included to allow the user to deactivate the illuminator 12 as desired.

Preferably, light energy emitted by light source 16 is optically coupled to an output coupler 35. Coupler 35 couples concentrated light into a fiber optic cable bundle of light delivery system 24 (FIG. 1), the optical cables of light delivery system 24 being connected to a connector 36.

Disposed intermediate light source 16 and optical coupler 35 is a light output modifying apparatus 20 having a movable device 72 (described below) mounted to housing 26. Further, a filter 39 (e.g., infrared) is preferably disposed between light source 16 and apparatus 20 for maximizing the efficiency of the transmission of the selected type of light. Illuminator 12 also preferably includes a control card 21 (FIG. 1) electrically coupled to light output modifying apparatus 20, preferably via a ribbon cable, for positioning apparatus 20 in response to input control signals transmitted by a system computer (not shown). Illuminator 12 also includes an electrical terminal bus 44 that receives control/power signals that have been transmitted, preferably, from a remote location. Illuminator 12 also includes a fan 42 for cooling the heat generating components of the system such as the electronic components. Also shown in FIG. 3 is a stepper motor 58 that is used to drive apparatus 20 (see below discussion). The operational aspects of these components will be described in more detail below.

Figure 4:
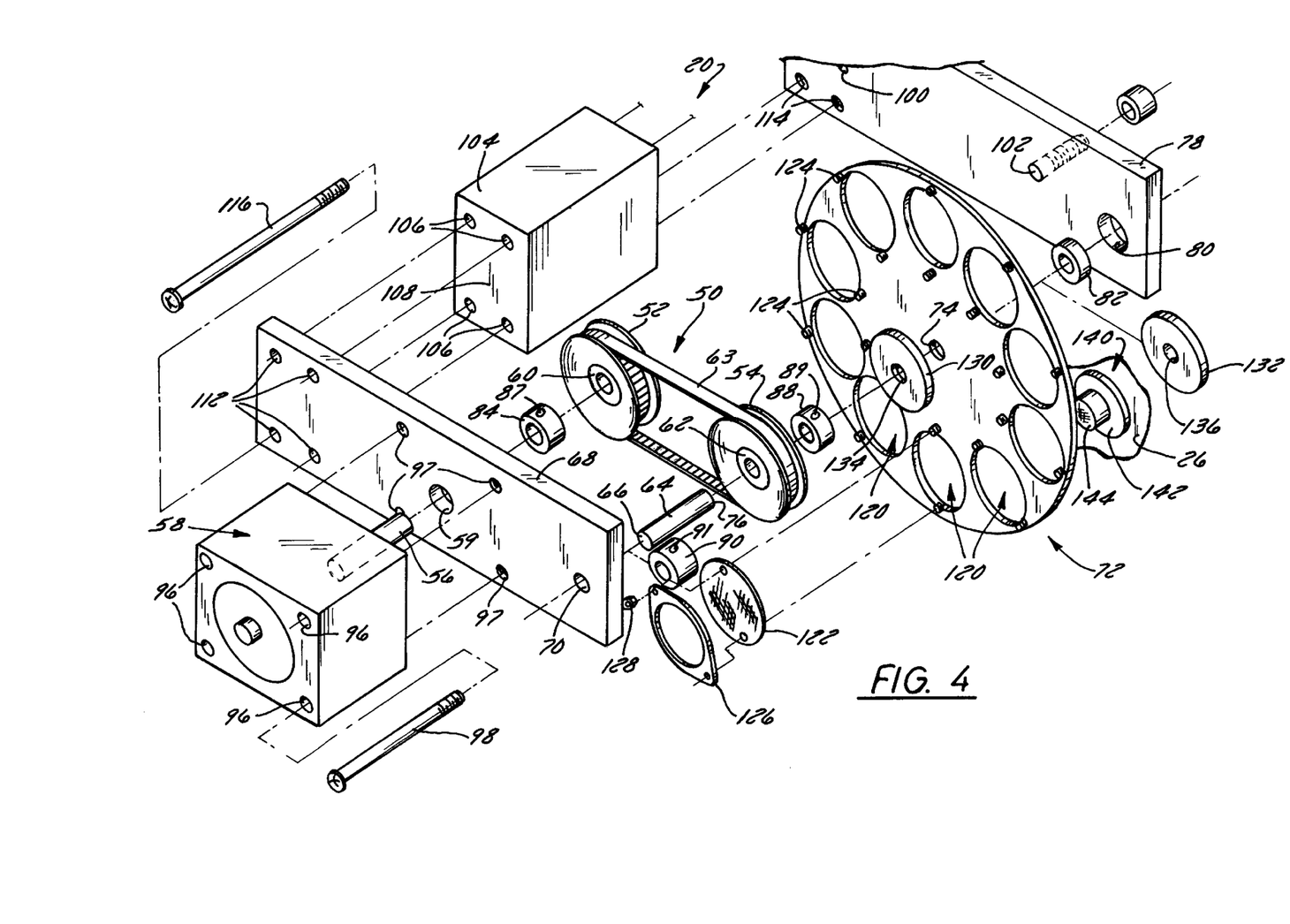
FIG. 4 is an exploded perspective view of a light output modifying apparatus according to the present invention and included in the system of FIG. 1 and in the illuminator of FIG. 2.
Figure 5:
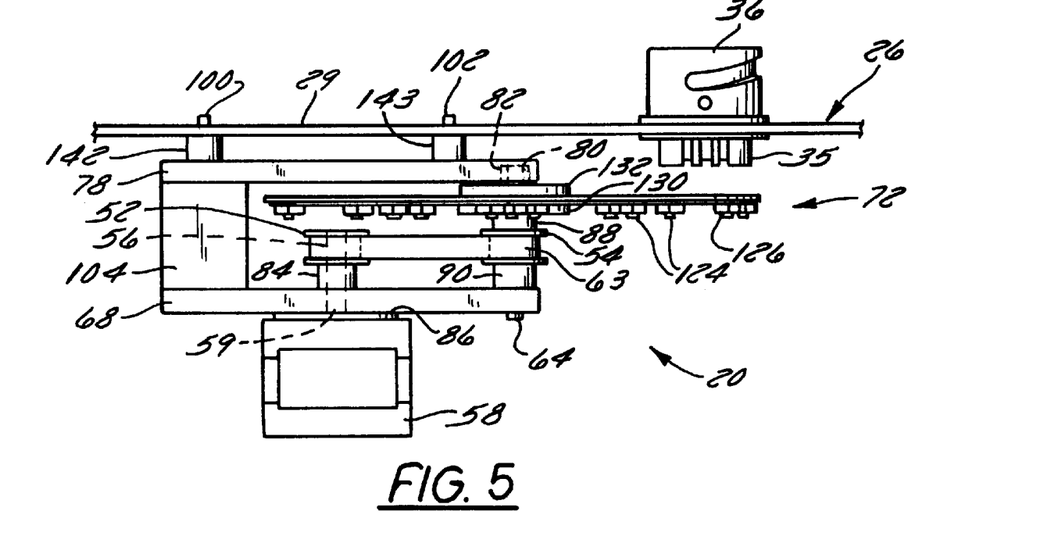
FIG. 5 is a top plan view of the light output modifying apparatus shown in FIG. 4.
Figure 6:
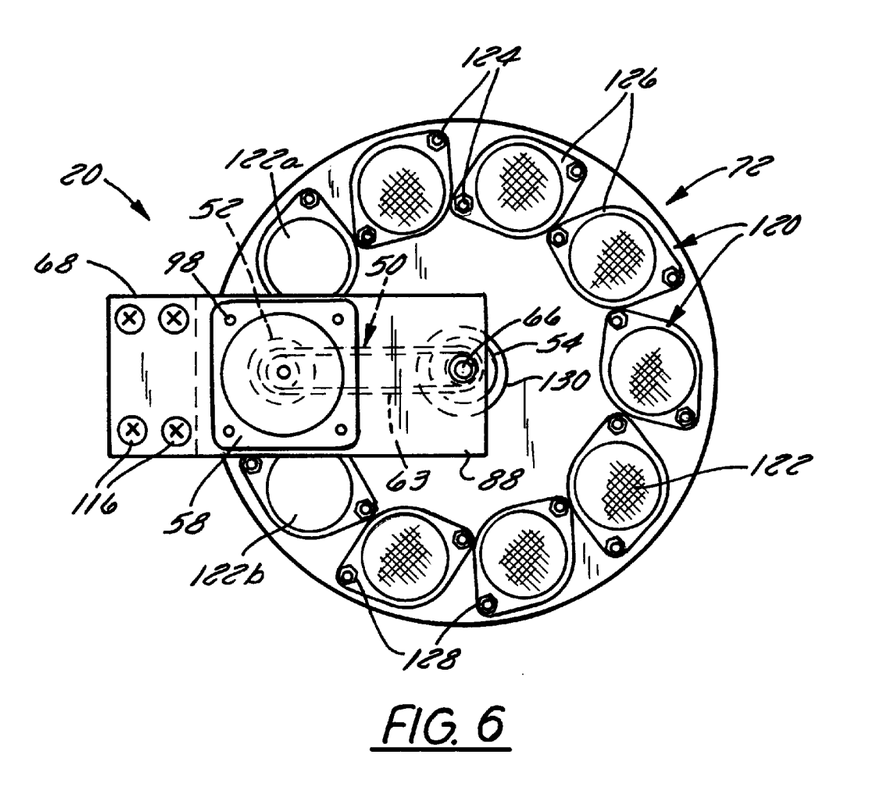
FIG. 6 is a front elevational view of the light output modifying apparatus shown in FIG. 5.

Turning to FIGS. 4, 5 and 6, the components of light output modifying apparatus 20 are shown. Apparatus 20 includes a torque transfer assembly 50 having a drive pulley 52 and a driven pulley 54 coupled to each other via a belt 63 made of, for example, a suitable rubber material. Drive pulley 52 includes a hub 60 for receiving a first end of a drive shaft 56 that is mechanically connected to the stepper motor 58 at its opposite end. Next, driven pulley 54 includes a hub 62 for receiving a first end 76 of a driven shaft 64 that has a second end 66 rotatably journaled in a bearing (not shown) mounted in a hole 70 in front plate 68. In addition to extending through hub 62, driven shaft 64 extends through and is attached to a movable device 72, e.g., a rotatable disk having a hub portion 74. At its first end 76, driven shaft 64 is rotatabaly journaled in an opening 80 of a back plate 78 via a bearing 82. Back plate 78 is mounted to studs 100, 102 attached to housing wall 29. Driven shaft 64 is keyed or otherwise affixed to the hub portion 74 of the movable device 72. In operation, driven shaft 64 rotates device 72 in response to an output force delivered by motor 58 in response to particular control signals transmitted by the system computer.

Torque transfer assembly 50 and movable device 72 are preferably sandwiched between the front and back plates 68, 78, respectively, while the drive pulley 52 is separated from front plate 68 by a bushing 84. In addition, bushings 88, 90 and shaft 64 separate driven pulley 54 from front plate 68 and disk 72, respectively, to maintain the integrity of the mechanical interconnections and ensure proper operation of torque transfer assembly 50. Bushings 84, 88, 90 each have a threaded radial opening 87, 89, 91, respectively, for accommodating a set screw (not shown) that secures bushings 84, 88, 90 to their respective shafts such that the bushings rotate with their corresponding shaft, thus reducing operational wear on shafts 56, 64.

Motor 58 is configured with a plurality of openings 96 alignable with a plurality of threaded openings 97 in front plate 68 for securing motor 58 to front plate 68 with a plurality of threaded bolts 98. Front plate 68 is preferably mounted to the floor of housing 26 (FIGS. 2 and 3) in conventional fashion for stabilizing apparatus 20, and particularly motor 58. To further stabilize apparatus 20, a support block 104 is positioned between front and back plates 68 and 78 such that planar end faces 108, 110 of block 104 abut flush against plates 68, 78, respectively, and such that openings 106 in the block 104 align with corresponding openings 112, 114 of front and back plates 68, 78. As a result, front and back plates 68, 78 can be clamped together by tightening a plurality of threaded bolts 116 (openings 114 preferably being threaded to accommodate bolts 116).

Movable device 72 includes a plurality of generally circular openings 120 equally spaced around its perimeter, each opening 120 accommodating a different type of light output modifying element 122. As shown in FIG. 4, each element 122 is a light-intensity controlling filter dimming the light energy. Rotatable disk 72 includes a plurality of studs 124 (for example, two per opening) for retaining light output modifying elements 122. Preferably, each set of studs 124 is threaded and configured to accommodate a retainer ring 126 which is attached to the disk 72 via threaded nuts which are adapted to be fastened to the corresponding studs 124. In this embodiment, each element 122 can be readily replaced or changed to a different type of light output modifying element, e.g., a color filter. Disk 72 includes front and back support members 130, 132 fixedly secured thereto, members 130, 132 having hubs 134, 136, respectively. Because disk 72 is relatively thin, members 130, 132 provide support to minimize mechanical noise and ensure the integrity of optical alignment between the light source 16 (FIGS. 1–3) and the selected light output modifying element 122. As shown in FIG. 4, movable device 72 is positioned such that one of the light output modifying elements 122 is aligned with an output port 140 of housing 26. Consequently, light from light source 16 (FIGS. 1–4) must pass through the selected element 22 prior to being coupled to optical coupler 142, and more specifically to fiber optic bundle 144.

In operation, motor 58 is responsive to control signals indicative of a desired output light, e.g., dimmed, colored, etc., the signals being transmitted from an illuminator control card (21 in FIG. 1) in response to input control signals from a computer disposed at a remote location. In particular, in response to an appropriate control card control signal, motor 58 rotates drive shaft 56, thus causing drive pulley 52, and therefore belt 63, to move. As a result, driven pulley 54 rotates. The rotation of driven pulley 54 correspondingly rotates driven shaft 64 and movable device 72 attached thereto to align a selected one of the elements 122 with output port 140. (FIG. 4) When device 72 is in a selected position, light energy from the light source 16 can be directed generally through the selected opening 120 containing the element 122 for appropriately modifying the light. As a result, movable device 72, and more particularly the selected light output modifying element 122, couples light received from the light source 16 to the fiber optic bundle 144, thus providing light having desired characteristics to predetermined lighting points.

In FIG. 5, a fully assembled and mounted view of light output modifying apparatus 20 of illuminator 12 is shown.

In particular, back plate 78 of apparatus 20 is preferably bolted to a perimeter wall 29 of housing 26 with appropriate fasteners 100, 102, e.g., stud members, and is separated from wall 29 via spacers 142, 143 associated with each stud 100, 102, respectively, to isolate apparatus 20 from housing 26 and minimize the effects of mechanical noise. Front plate 68 is coupled to a rearward facing wall 86 of the enclosure of stepper motor 58 and includes a passageway 59 within which drive shaft 56 can rotate. Overall, the construction of apparatus 20 maintains the stability of movable device 72 (i.e., disk) such that light energy propagating through one of openings 120 (FIG. 4) of disk 72 is not refracted or altered in any other way prior to being coupled to output port 140.

With particular reference to FIG. 6, each of the light output modifying elements 122 is readily removable for repair, or for replacement with a different type of element that may produce any of a variety of output light characteristics. For example, a light intensity filtering element (described below with reference to FIG. 7) or a color filter element may be interchanged with a light blocking element 122a for impeding the coupling of light from the source, or with a transparent element 122b (or left empty) for permitting 100% of the light energy to be coupled to optical coupler 35.

Figure 7:
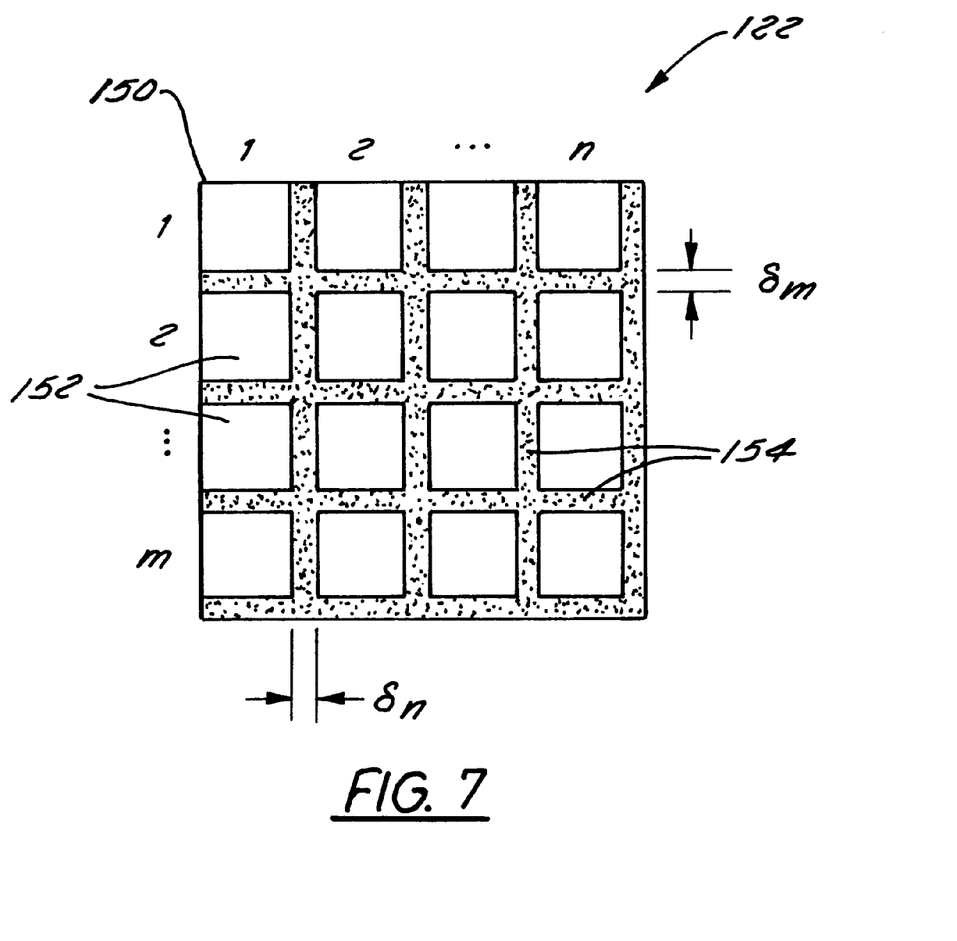
FIG. 7 is a schematic view of a 2-D binary quasi-periodical structure according to the present invention.

FIG. 7 illustrates a preferred construction of a light modifying element 122 having a two-dimensional binary quasi-periodical structure 150. Structure 150 provides a relatively inexpensive device for modifying the output light, e.g., by dimming the input light, according to user specifications. Two-dimensional binary quasi-periodical structures 150 of the preferred embodiment preferably consist of a predetermined number of transparent and non-transparent elements 152, 154, respectively. Structures 150 offer significant advantages over known alternatives for dimming light, such as absorption optical filters, which are not practical in high power lighting systems due to poor performance relating heat resistance requirements and unacceptably high manufacturing costs. In addition, structures 150 provide advantages over other types of known devices, such as reflective optical filters (which exhibit problems relating to light source and reflective performance), and changeable aperture devices (having calibrated windows, irises and slots which in simple versions cannot provide the required accuracy, in more sophisticated versions, become bulky and prohibitively expensive).

By using two-dimensional binary quasi-periodical structures 150, one single structure or a combination of several such structures can provide a wide range of light energy attenuation with high accuracy and minimal manufacturing expense. Such structures are particularly useful in systems with non-trivial two-dimensional light distribution, and particularly for RSL systems where the light produced by the optics subsystem (i.e., illuminator) is coupled into a fiber bundle (144 in FIG. 4) that has precalculated randomization. A characteristic of 2-D binary quasi-periodical structures 150 of FIG. 6 is defined by an attenuation coefficient $A_k(x,y)$ that can be derived from the transparency $T_k(x,y)$. The following equation defines this relationship for a single mask:

$$A_K(x, y) = \frac{1}{T_K(x, y)} = \frac{m_k \cdot n_k}{m_k \cdot n_k - m_k \delta_{mk} - n_k \delta_{nk}} \quad (1)$$

where $m_k$ is the number of rows in the structure, $n_k$ is the number of columns, $\delta_{mk}$ is the linear dimension of the non-transmitting portion of the row, and $\delta_{nk}$ is the linear dimension of the non-transmitting portion of the columns.

As suggested above, to achieve any desired output light characteristic, such attentuator structures 150 can be combined, preferably by stacking structures 150 flush against one another to create an element 122 for producing output light energy having a desired characteristic, such that for any combination of k structures, the total attenuation coefficient $A_k(x,y)$ can be calculated by the following equation:

$$A(x, y) = \prod_{i=1}^{i=k} A_i(x, y) \quad (2)$$

For example, Table 1 identifies calculated and measured transparencies for a number of symmetrical 2-D binary quasi-periodical structures 150, i.e., where symmetrical means that m=n, and $\delta_m = \delta_n$.

TABLE 1

| Type | m × n (per inch) | $\delta_m$, $\delta_n$ (inch) | Transparency % Calculated | Transparency % Measured |
|---|---|---|---|---|
| A | 18 × 18 | 0.017 | 48.3 | 48.6 |
| B | 30 × 30 | 0.01 | 45.3 | 45.7 |
| C | 150 × 150 | 0.026 | 39.9 | 40.3 |
| D | 250 × 250 | 0.016 | 36.0 | 39.6 |
| E | 400 × 400 | 0.01 | 35.0 | 29.7 |
| F | 50 × 50 | 0.09 | 30.3 | 28.7 |
| G | 60 × 60 | 0.075 | 30.0 | 28.6 |
| H | 500 × 500 | 0.01 | 25.0 | 27.3 |

By using data from Table 1 and Equation 2, the combination of structures needed to produce, for example, the standard five step attenuation in an approach lighting system (ALS) according to FAA and ICAO regulations (e.g., as used at an airfield) is shown in Table 2, indicating the calculated and measured transparency for such an application. Note that at Step B-5, an attenuating light modifying element 122 should not be disposed intermediate the light source and optical connector (i.e., element 122b shown in FIG. 6 is disposed between the light source and optical connector) because the intensity of the source light should not be attenuated at all, thus allowing 100% of the intensity of the light to be coupled to the output of illuminator 12.

TABLE 2

| Step | Required Intensity (%) | Combination of Attneuator Structures | Transparency % Calculated | Transparency % Measured |
|---|---|---|---|---|
| B-5 | 100 | — | — | — |
| B-4 | 20 | B + B | 20.5 | 20.0 |
| B-3 | 4 | A + B + C | 3.99 | 4.0 |
| B-2 | 0.8 | F + F + G + G | 0.85 | 0.81 |
| B-1 | 0.16 | A + E + F + G + H | 0.2 | 0.16 |

Of course, 2-D quasi-periodical structures may be designed to produce particular output light by modifying the appropriate variables of Equations (1) and (2). Further, such structures may be formed to correspond to any shape of opening 120 of disk 72 (FIG. 4). As mentioned previously, openings 120 in disk 72 can also include a filter, for example, a standard off-the-shelf type optical filter, for modifying the color of the output light transmitted by illuminator 12, and such a filter can be further combined with dimming structures 150 to produce the desired output light.

Figure 8:
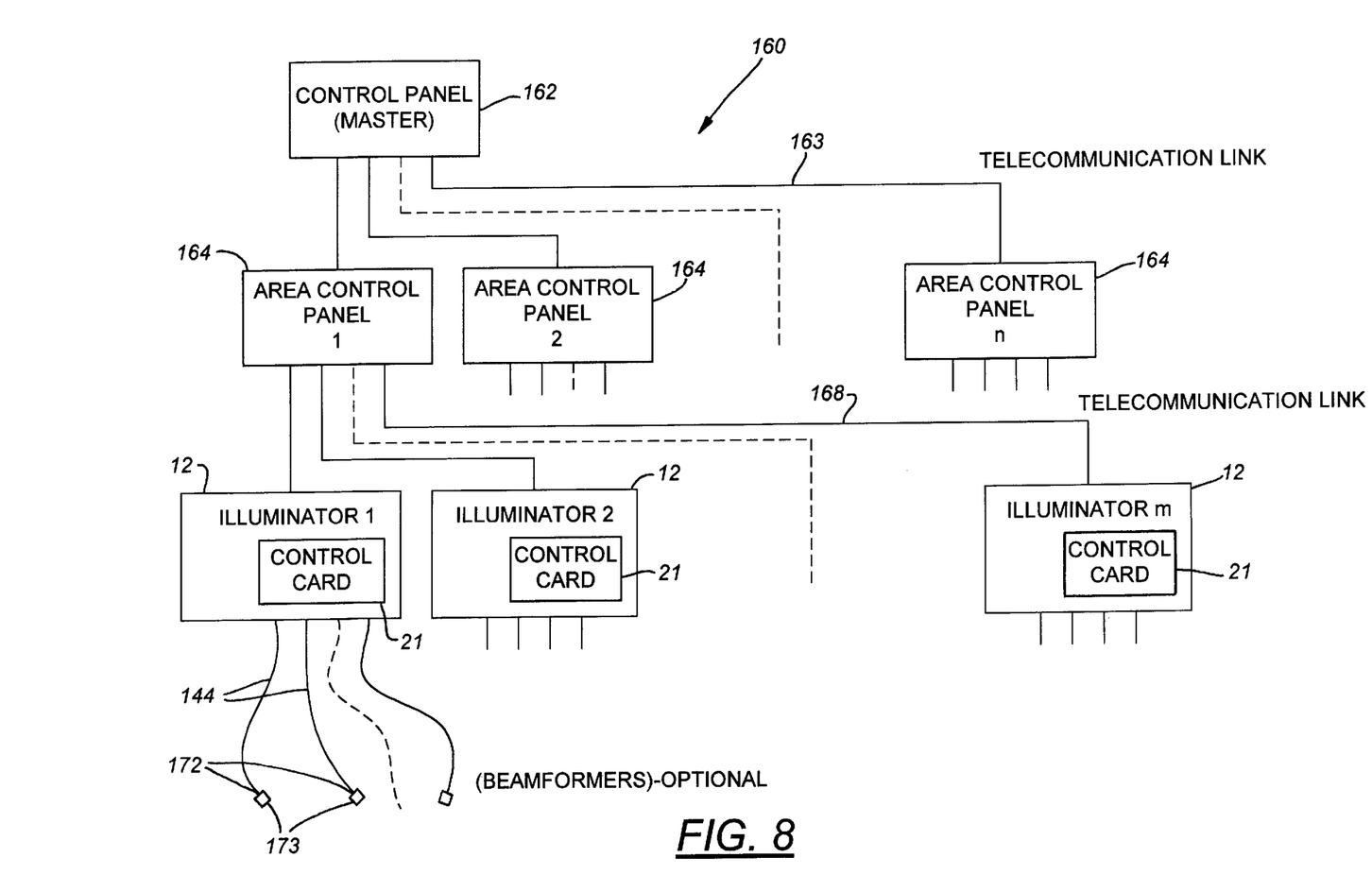
FIG. 8 is schematic view of a remote lighting system including a plurality of illuminators according to the present invention.

Turning to FIG. 8, a remote lighting system (RLS) 160 is shown which includes a plurality of illuminators 12 according to the preferred embodiment (i.e., which have a corresponding light output modifying apparatus 20 capable of providing light having selected characteristics). In particular, a master control panel 162 (e.g., a bridge control panel or air traffic control tower) is included that transmits control signals, via a telecommunication link 163, to any one of a combination of area control panels 164. Area control panels 164, in turn, can be user controlled and/or programmably controlled to output control signals indicative of a selected type of light to individual illuminators 12 via another telecommunication link 168. For example, on a navel ship, where particular areas of the ship may require a different type of lighting, individual area control panels 164 provide an efficient way of controlling respective illuminators 12 to achieve the particular lighting desired, i.e., without having to operate bridge control panel 162 or to individually operate illuminators 12 or the individual lighting points (not shown). Alternatively, a user situated at bridge control panel 162 can operate a control board for instructing area control panels 164 to generate output signals indicative of lighting desired.

More specifically, the control card 21 of each illuminator generates a control signal that the illuminator 12 transmits to the motor 58 (FIG. 4) of the associated light output modifying apparatus 20. In response, motor 58 positions movable device 72 (FIGS. 4–6) such that the output light (having desired characteristics, e.g., dimmed or colored light) from that illuminator 12 is coupled to optical cables 144. Each one of optical cables 144 includes a distal end 172 for providing light to strategically placed lighting points in the lighted area (not shown). Note that distal ends 172 may or may not include a beamformer 173 for shaping the outgoing light into a desired pattern, as shown and described in U.S. Pat. No. 5,629,996, the subject matter of which is hereby incorporated by reference. In sum, each illuminator 12 can be remotely controlled by either individual area control panels 164 or by a master bridge control panel 162 to provide the most efficient distribution of light according to specific user requirements.

The foregoing descriptions of preferred embodiments are provided by way of illustration. Practice of the present invention is not limited thereto and variations therefrom will be readily apparent to those of ordinary skill in the art without deviating from the spirit and scope of the underlying inventive concept.

What is claimed is:

1. An illuminator for a high energy remote lighting system, the illuminator comprising:

a light source that generates light energy;

a housing having an output port;

an optical connector coupled to said output port, said optical connector being coupleable to a light conveying device; and a light output modifying apparatus disposed downstream of said light source in a direction of light energy propagation, having a plurality of light output modifying elements, wherein at least one of the light output modifying elements comprises a light intensity controlling filter having a two-dimensional quasi-periodical structure, and wherein at least a portion of said light output modifying apparatus is movable to selectively position a selected one of said light output modifying elements at a location intermediate said light source and said optical connector to receive light energy generated by said light source and to selectively control the intensity of light energy output by said illuminator.

2. An illuminator according to claim 1, wherein said light output modifying apparatus further includes, (a) a controller configured to provide a control signal indicative of a particular characteristic type of light energy desired to be output by said illuminator;

(b) a movable device having a plurality of openings, each opening configured to retain at least one of said light output modifying elements; and (c) a motor coupled to said movable device to move said movable device in response to said control signal.

3. An illuminator according to claim 2, wherein said movable device is a rotatable disk, and wherein said motor includes a rotatable drive shaft mechanically coupled to said disk to rotate said disk in response to said control signal.

4. An illuminator according to claim 3, wherein said plurality of light output modifying elements are mutually spaced and disposed around a perimeter of said disk.

5. An illuminator according to claim 3, wherein said light output modifying apparatus further comprises a pulley which couples said rotatable drive shaft to said disk.

6. An illuminator according to claim 3, wherein said motor is a stepper motor.

7. An illuminator according to claim 2, wherein said light source is a lamp.

8. An illuminator according to claim 7, further including an optical filter disposable intermediate said light output modifying apparatus and said optical connector.

9. An illuminator according to claim 1, wherein a characteristic of said quasi-periodical structure is defined by an attenuation coefficient having the following relationship, $$A_K(x, y) = \frac{1}{T_K(x, y)} = \frac{m_k \cdot n_k}{m_k \cdot n_k - m_k \delta_{mk} - n_k \delta_{nk}},$$

wherein $A_K(x, y)$ is the attenuation coefficient of said structure;

wherein $T_K(x, y)$ is a transparency of said structure;

wherein $m_k$ is a number of rows in said structure;

wherein $n_k$ is a number of columns in said structure;

wherein $\delta_{mk}$ is a linear dimension of a non-transmitting portion of the rows; and wherein $\delta_{nk}$ is a linear dimension of a non-transmitting portion of the columns.

10. An illuminator according to claim 1, wherein at least one of said light output modifying elements is a color filter.

11. A method of remotely providing light to a plurality of lighting points, the method comprising the steps of:

providing an illuminator having (a) a light source that generates light energy, (b) a controller for providing an output control signal indicative of the particular characteristic in response to an input control signal received from a system computer, (c) a selectively positionable light output modifying apparatus having a plurality of light output modifying elements, said apparatus being disposed downstream of said light source in a direction of light energy propagation, (d) a motor responsive to said output control signal;

transmitting said output control signal to said motor;

directing light from said light source towards said apparatus; and selectively positioning said apparatus, via operation of said motor, such that a selected one of said elements receives said light energy of a first intensity, and produces output light energy of a selected second intensity, wherein said second intensity differs from said first intensity, and wherein the selected one of the elements comprises a two-dimensional quasi-periodical structure.

12. A remote lighting system that transmits light to a plurality of lighting points, the system comprising:
   a plurality of area control panels, each area control panel generating a control signal indicative of at least a light intensity level;
   a plurality of illuminators each coupled to a corresponding one of said area control panels via a telecommunication link, said illuminators being configured to receive said corresponding control signal and to output light energy to a plurality of optical cables each having a distal end for emitting the light energy output by the corresponding illuminator; and
   wherein each said illuminator includes,
      (a) a light source that generates light energy having a particular intensity, and
      (b) a selectively positionable light output modifying apparatus disposed downstream of said light source in a direction of light energy propagation, said apparatus having a plurality of light output modifying elements, wherein a selected one of said light output modifying elements receives said light energy and produces output light energy having the light intensity level, wherein the light intensity level differs from the particular intensity.

13. An illuminator for a high energy remote lighting system, the illuminator comprising:
   a light source that generates light energy;
   a selectively positionable light output modifying apparatus disposed downstream of said light source in a direction of light energy propagation, said modifying apparatus having a plurality of light output modifying elements, each modifying element corresponding to a predetermined position of said modifying apparatus, and
   wherein a selected one of said modifying elements receives said light energy at a first intensity level and produces output light energy at a selected second intensity level that differs from said first intensity, and wherein the selected one of the modifying elements comprises a two-dimensional quasi-periodical structure.

14. An illuminator according to claim 13, wherein said modifying apparatus further includes,
   (a) a controller configured to provide a control signal indicative of the particular light characteristic;
   (b) a movable device having a plurality of openings, each opening configured to retain at least one of said modifying elements; and
   (c) a motor coupled to said movable device and operable to selectively position said device in response to said control signal.

15. An illuminator according to claim 14, wherein at least one of said modifying elements is a light intensity controlling filter.

16. An illuminator according to claim 15, wherein said light intensity controlling filter is a two-dimensional quasi-periodical structure.

17. An illuminator according to claim 16, wherein a characteristic of said quasi-periodical structure is defined by an attenuation coefficient having the following relationship, $$A_K(x, y) = \frac{1}{T_K(x, y)} = \frac{m_k \cdot n_k}{m_k \cdot n_k - m_k \delta_{mk} - n_k \delta_{nk}},$$

wherein $A_K(x, y)$ is the attenuation coefficient of said structure;

wherein $T_K(x, y)$ is a transparency of said structure;

wherein $m_k$ is a number of rows in said structure;

wherein $n_k$ is a number of columns in said structure;

wherein $\delta_{mk}$ is a linear dimension of a non-transmitting portion of the rows; and wherein $\delta_{nk}$ is a linear dimension of a non-transmitting portion of the columns.

18. An illuminator for a high energy remote lighting system, the illuminator comprising:
   a light source that generates light energy;
   a housing having an output port;
   an optical connector coupled to said output port;
   a selectively positionable light output modifying apparatus disposed downstream of said light source in a direction of light energy propagation, said apparatus having
      (a) a plurality of light output modifying elements,
      (b) a controller configured to provide a control signal of light energy desired to be output by the illuminator,
      (c) a movable disk having a plurality of openings, each opening being configured to retain at least one of said light output modifying elements, and
      (d) a motor coupled to said movable disk and operable to position said movable disk in response to said control signal; and
   wherein a selected one of said light output modifying elements receives said light energy and produces output light energy having the particular characteristic, and wherein at least one of said light output modifying elements is a color filter and others of said light output modifying elements comprise a two-dimensional quasi-periodical structure and are configured to selectively modify the intensity of the output light energy relative to the intensity of the input light energy.

* * * * *